United States Patent [19]

Cox

[11] Patent Number: 4,763,355

[45] Date of Patent: Aug. 9, 1988

[54] COMBINED WRITING AND SIGNALING INSTRUMENT

[76] Inventor: James A. Cox, 116 Rue du Bois, Cherry Hill, N.J. 08003

[21] Appl. No.: 29,856

[22] Filed: Mar. 24, 1987

[51] Int. Cl.⁴ ............................................. H04M 1/50
[52] U.S. Cl. .................................. 379/355; 379/361; 379/110; 340/384 E
[58] Field of Search ............... 379/355, 356, 359, 361, 379/110, 418, 444; 340/384 E, 825.25

[56] References Cited

U.S. PATENT DOCUMENTS

| | | | |
|---|---|---|---|
| 4,130,738 | 12/1978 | Sandstedt | 379/355 |
| 4,335,377 | 6/1982 | Bostic | 340/573 |
| 4,337,460 | 6/1982 | Smith, III et al. | 340/384 E |
| 4,459,474 | 7/1984 | Walton | 235/380 |

*Primary Examiner*—Stafford D. Schreyer
*Attorney, Agent, or Firm*—Austin R. Miller

[57] ABSTRACT

The present invention provides a pen or mechanical pencil capable of producing telephonic sound tones. A housing is equipped with either ink and ink dispensing means or pencil lead and lead dispensing means. An electronic memory/logic circuit is placed within the housing and is connected to a speaker which generates and transmits audible tones. A battery or batteries within the housing provides power and a switch completes the circuit and actuates tone generation.

15 Claims, 4 Drawing Sheets

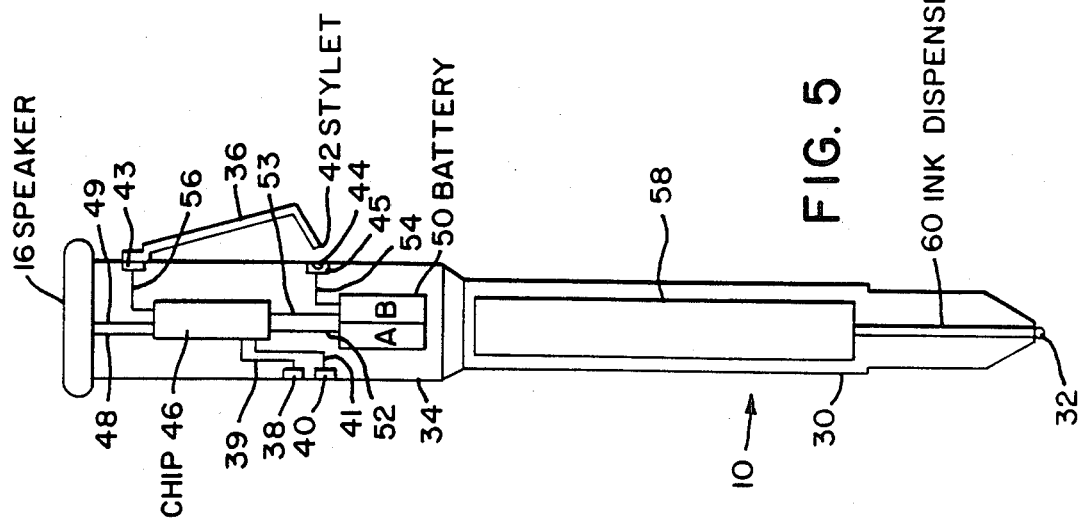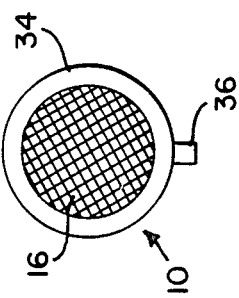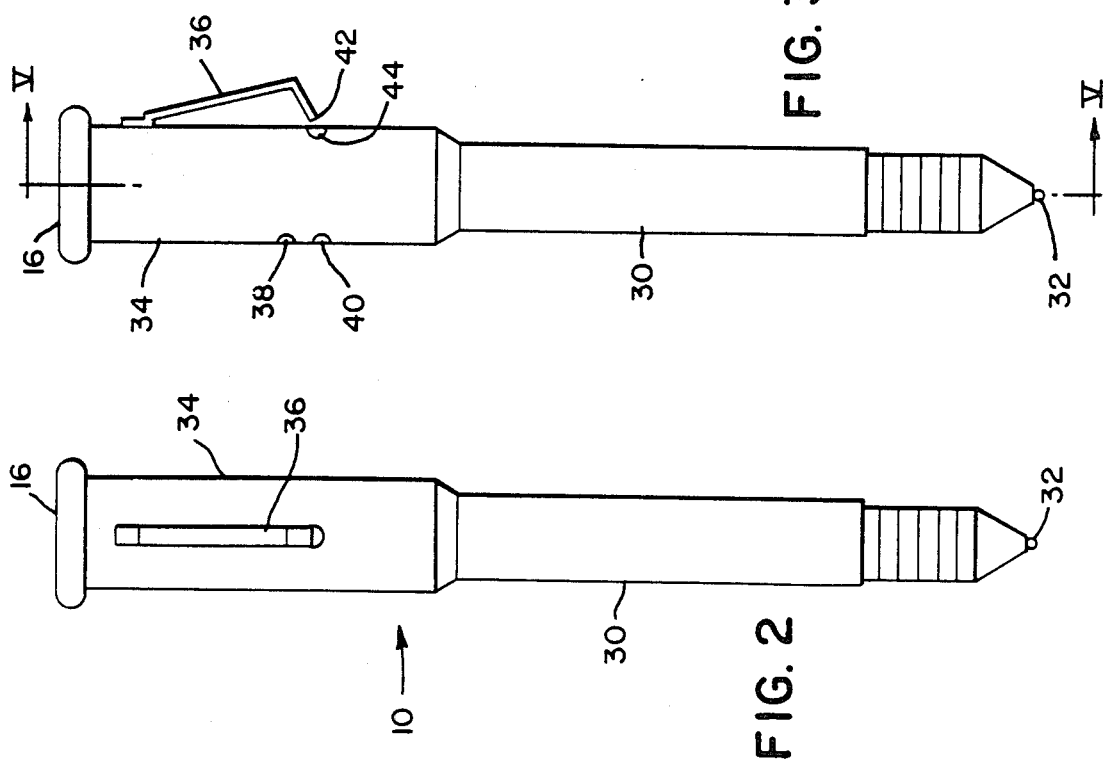

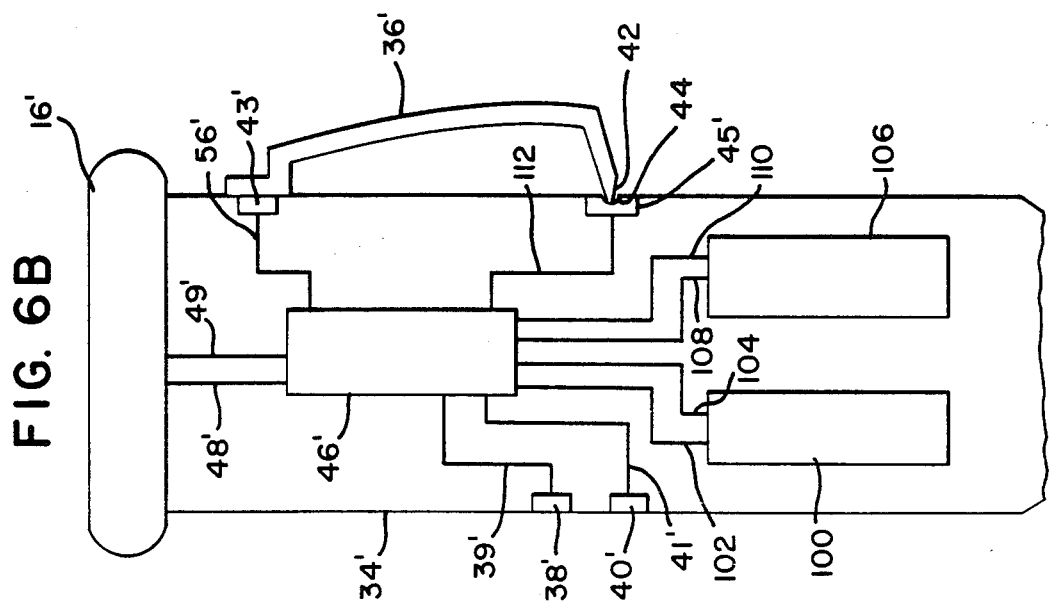
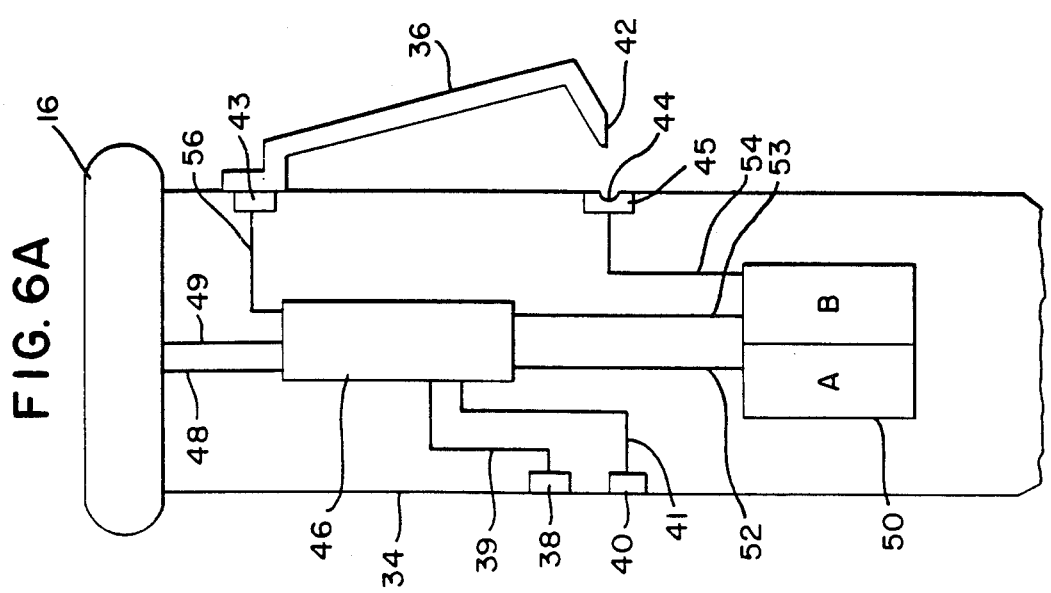

COMBINED WRITING AND SIGNALING INSTRUMENT

BACKGROUND OF THE INVENTION

The present invention relates to a combined writing and signaling instrument, particularly to a pen or mechanical pencil capable of generating telephonic sound tones corresponding to numerical digits, for transmission over a telephone.

FIELD OF THE INVENTION

With recent advancements in telephones and telephone transmission, such as the development of digital "touch tone" equipment for example, it is possible by use of sound tones corresponding and assigned to the numerals 0–9 to transmit a number or series of numbers over a phone to a receiving party by directing the sound tones into the telephone mouthpiece.

It is possible telephonically to conduct banking transactions from remote locations such as by computer, automatic teller machines or the like. However, security mandates that the customer must identify him or herself with an assigned secret number or an account number. It is undesirable to write down such numbers, but they are typically easily forgotten.

In another situation where a consumer desires to order merchandise over the telephone, it is necessary for the purchaser to identify him or herself, provide a delivery address and supply means for payment. Typically payment is made by credit card or through a charge/deposit account held with the vendor. In order to transact the purchase a credit card and or account number must be given.

Further improvements in telephone technology have resulted in the issuance of telephone credit cards or "travel" cards having either account numbers and/or telephone numbers as an identification means. In the case of credit cards, it has often been necessary to utilize special telephones capable of accepting and magnetically reading the card, which telephones are frequently unavailable. Similar difficulties arise with account numbers because they are typically quite lengthy and can require the entry of up to 20 numerals or more, which is inconvenient and subject to dialing error.

Persons who travel frequently often employ a multitude of credit cards and telephone numbers to conduct business. For example, a typical salesman may require credit card numbers for lodging, car rentals, dining and other entertainment and fuel. Similarly, such a person would have an array of frequently called telephone numbers, which include their home, head office, travel agent, a list of customers or a list of suppliers, for example. Remembering such a vast list of numbers is inconvenient and maybe not possible.

DESCRIPTION OF THE PRIOR ART

U.S. Pat. No. 4,335,377 discloses a compact medical alert alarm. Audible sounds to alert nearby persons of a medical emergency are generated by a recessed speaker and emanate from the end of a generally cylindrical housing by way of a grill. A finger slidable switch activates solid generation, which is of a volume and frequency to be easily identifiable by passerbys. A pill compartment is provided to carry a small supply of emergency medications.

The alarm, however, can produce only a single sound frequency, which would not permit the transmission of a variety of numbers. The sound produced is also comparatively loud in order that persons will take note of the ailing person. Such volume is not appropriate for telephone transmissions. In order to generate high sound volumes, a comparatively large speaker is employed which necessarily enlarges the diameter of the device; preferably to about ⅝ of an inch.

U.S. Pat. No. 4,337,460 discloses a hand-held sound effects device generating siren, train, gun, etc. type noises. The circuit in the device includes an audio signal generator, an amplifier, a sound selector, a pitch controller, an oscillator controllor, an audio transducer, a switch, a speaker and a battery.

The device is comparatively large in that the large number of components increases the size to the point where it would tend not to be easily transported in a convenient manner. It produces sounds at comparatively large volumes which are undesirable for telephonic transmission.

U.S. Pat. No. 4,459,474 discloses a credit card size identification system for transmitting identification signals. The device generates and transmits primarily by antenna signals from a logic circuit. Optionally a speaker may be provided in order to transmit audible signals through a telephone network. Identification transmission is its sole function.

Tandy Corporation manufactures a hand-held "Pocket Tone Dialer" Model No. 43-140, which contains a speaker, a battery, numeral keys, an entry key, a store key and an activation switch. It is designed to store telephone numbers and selectively transmit them over a telephone to dial the desired number. The dialer measures about $2\frac{1}{4}'' \times 4\frac{7}{8}'' \times 1''$ and is therefore comparatively large. Telephonic transmission is its sole function.

OBJECTS OF THE INVENTION

It is an object of the present invention to provide a writing instrument which is compact and easy to carry but is also capable of transmitting numbers over a telephone.

It is another object of the present invention to provide a number generating and transmitting device which is miniature in size and light in weight so as to be easily carried by a user and can also function effectively as a writing instrument.

It is an important object of the present invention to provide a number generating and transmitting device having more than a single function so as to aid the user in remembering to carry the device during times when use would be likely.

It is a further object of the present invention to provide a number generating and transmitting device capable of storing a multiplicity of series of numbers.

Other objects and advantages of the present invention will become apparent to those skilled in the art from the drawings, the detailed description of preferred embodiments and the appended claims.

SUMMARY OF THE INVENTION

The present invention provides a pen or mechanical pencil capable of producing telephonic sound tones. A housing is equipped with either ink and ink dispensing means or pencil lead and lead dispensing means. An electronic memory/logic circuit is placed within the housing and is connected to a speaker which generates and transmits the audible tones. A battery or batteries within the housing provides power and a switch completes the circuit and actuates tone generation.

BRIEF DESCRIPTION OF THE DRAWING

FIG. 2 is a front elevational view of one embodiment of a writing and transmitting instrument according to the present invention.

FIG. 3 is a side elevational view of the writing and transmitting instrument a depicted in FIG. 2.

FIG. 4 is a top plan view of the embodiment shown in FIG. 2.

FIG. 5 is a vertical schematic cross sectional view taken as indicated by the lines and arrows V—V which appear in FIG. 3.

FIG. 6A is an enlarged vertical schematic view of the transmitting end of the invention shown in FIG. 5.

FIG. 6B is an enlarged vertical schematic view of another embodiment of the transmitting end of the invention shown in FIG. 5 in a transmit mode.

DETAILED DESCRIPTION OF THE INVENTION

Figure 1:
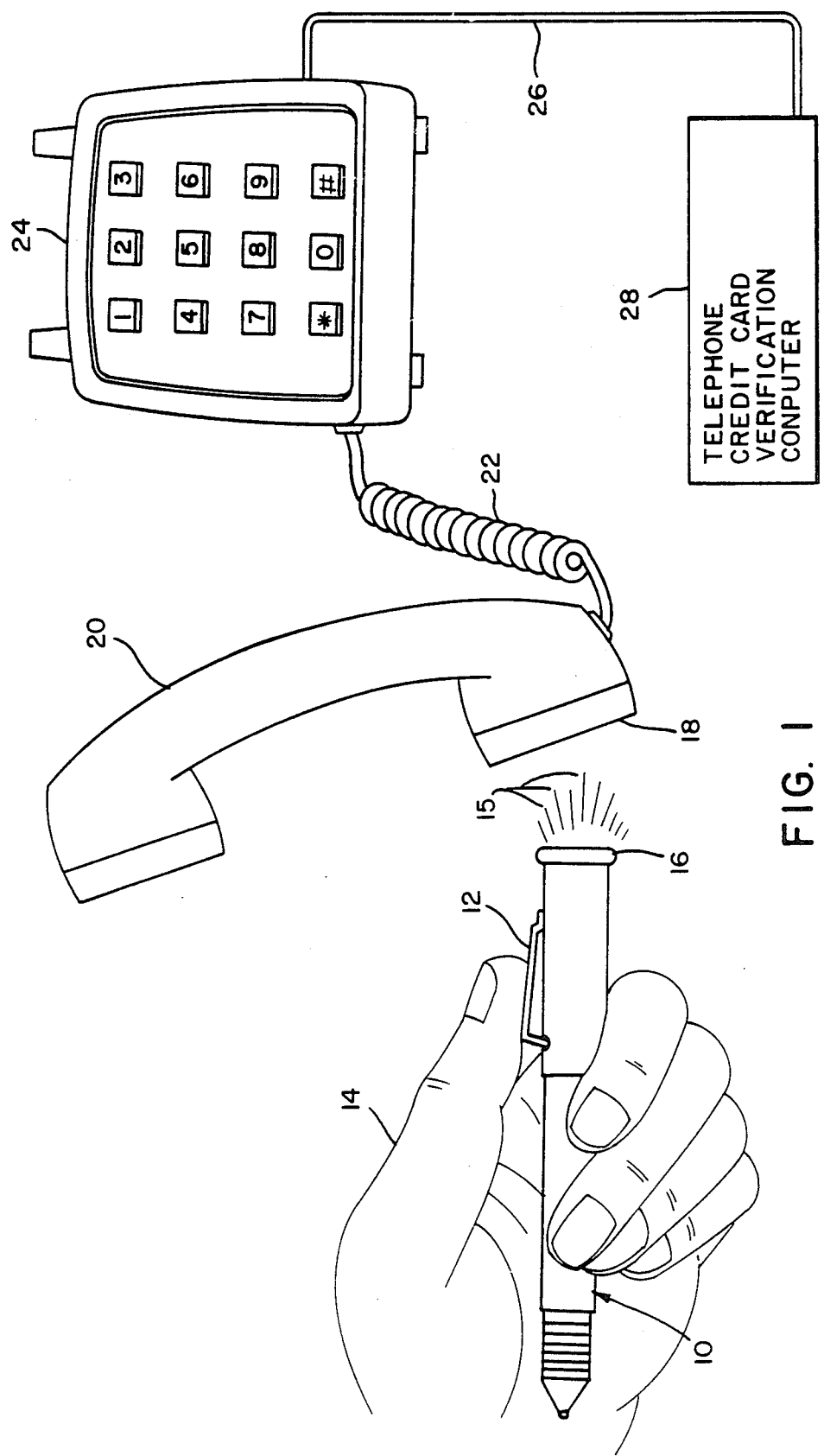
FIG. 1 shows schematically how numbers are transferred over a telephone with a writing and transmitting instrument in accordance with the present invention.

FIG. 1 depicts instrument 10 in use in a typical fashion. Pen clip 12 is depressed by thumb 14, thereby actuating telephonic sound tone generation. Tones 15 are transmitted from speaker 16 and are received in mouthpiece 18 of telephone receiver 20. Mouthpiece 18 converts audible tones into electric signals which follow along receiver wire 22, through telephone 24 (touch tone or rotary), transmission wire 26 and into a credit card verification computer 28.

Referring generally to FIGS. 2, 3, and 4, a preferred embodiment of instrument 10 is shown. Generally cylindrically shaped barrel 30 contains pen or pencil tip hole 32. Cap 34 connects to barrel 30 and includes clip 36, set button 38, store button 40 and speaker 16. Clip 36 is provided with stylet 42 which can project through cap hole 44.

FIGS. 5 and 6A show schematically instrument 10. Connected to speaker 16 is logic/memory/speaker driver chip 46 by way of speaker wires 48 and 49. Chip 46 is powered by battery 50 which is connected by wires 52 and 53. Battery 50 is divided into a speaker power supply "A" and a chip/switch power supply "B." Set button 38 and store button 40 connect to chip 46 by wires 39 and 41, respectively. Clip 36 is fixed to Cap 34 at contact 43 and connects to chip 46 by way of clip wire 56. Stylet 42 is shown ready to be depressed through cap hole 44 and into contact with chip contact 45. Contact 45 connects to battery 50 by way of wire 54 to complete the circuit. Ink container 58 resides within barrel 30 and connects to ink dispenser tip 60 which is extendable through barrel hole 32.

FIG. 6B shows a first alternate embodiment of instrument 10. Connected to speaker 16' is logic/memory chip 46' by way of speaker wires 48' and 49'. Speaker 16' is powered by battery 100 which is connected through chip 46' by wires 102, 104, 48' and 49'. Chip 46' is powered by battery 106 which is connected by wires 108 and 110. Set button 38' and store button 40' connect to chip 46' by wires 39' and 40', respectively. Clip 36' is fixed to cap 34' at contact 43' and connects to chip 46' by way of clip wire 56'. Stylet 42' is shown depressed through cap hole 44 and contacts chip contact 45'. Contact 45' connects to chip 46' by way of wire 112 to complete the circuit.

Figure 8:
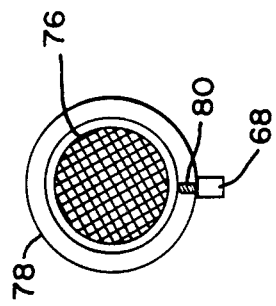
FIG. 8 shows a top plan view of the embodiment of the invention depicted in FIG. 7.
Figure 7:
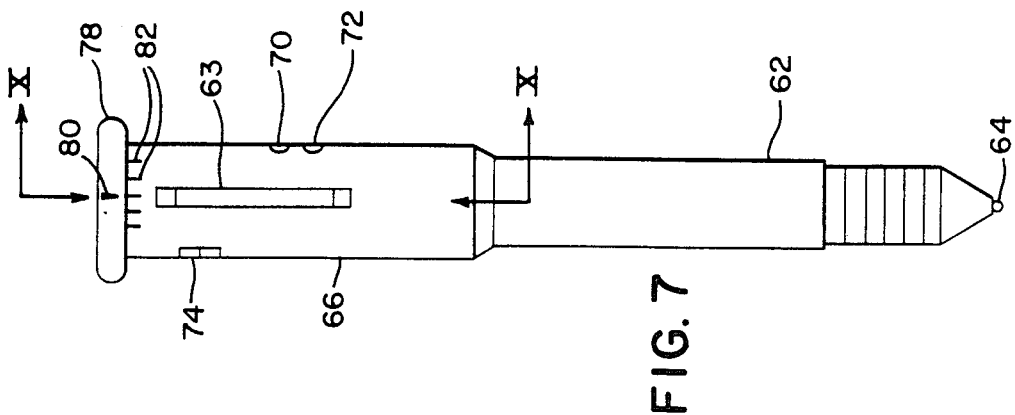
FIG. 7 is a front elevational view of another embodiment of writing and transmitting apparatus in accordance with the invention.

In FIGS. 7 and 8, another embodiment of instrument 10 is shown. Barrel 62 has barrel hole 64 for an ink dispenser tip or pencil lead. Cap 66 connects to barrel 62 and has clip 68, set button 70, store button 72, switch 74, speaker 76, and rotary ring 78. Rotary ring 78 is provided with a pointer 80 which selectively aligns with markers 82 on cap 66.

Figure 9:
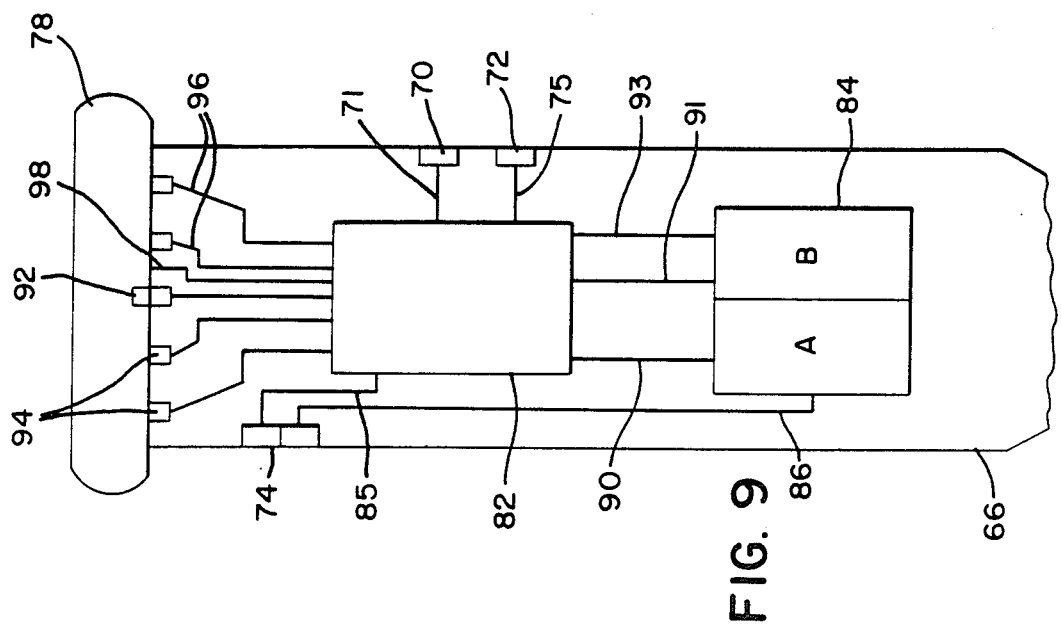
FIG. 9 is an enlarged vertical schematic cross sectional view of the transmitting end of the invention taken as indicated by the lines and arrows X—X which appear in FIG. 7.

In FIG. 9, switch 74 connects to chip 82 by wire 85 and to battery 84 by wire 86. Wires 90, 91 and 93 connect battery 84 and chip 82. Battery 84 is divided into a speaker power supply cell "B" and a chip/switch cell "A." Set button 70 and store button 72 connect to chip 82 through wires 71 and 73, respectively. Markers 82 from FIG. 7 correspond to marker contacts 94. Pointer 80 from FIG. 7 corresponds to pointer contact 92. Pointer contact 92 is engaged to a center marker contact. Each marker contact 94 connects to chip 82 by a wire 96. Speaker 76 (FIG. 8) connects directly to pointer contact 92 and to wire 98 which connects to chip 82.

Figure 10:
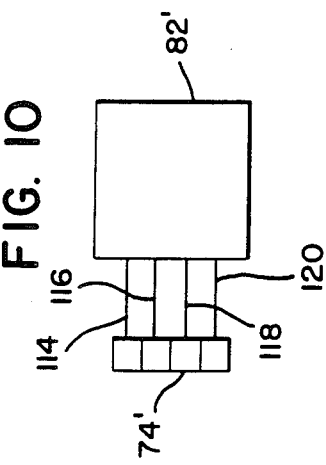
FIG. 10 shows an enlarged vertical schematic view of alternate switch means connected to the memory/logic chip of the invention, broken away for ease of understanding.

In FIG. 10 an alternative type switch 74' is shown connected to chip 82'. Switch 74' is divided into four zones (shown but not numbered), with each zone connected to chip 82' by way of a wire 114, 116, 118 and 120, respectively.

Prior to operation instrument 10, a credit card number, telephone number, account number, identification and/or the like should be entered into the device. In a preferred configuration set button 38 is depressed the number of times needed to equal the desired numeral to be entered. For example, if the numeral seven (7) is to be entered, set button 38 should be depressed seven times. To store the numeral, the store button 40 is pressed. The next numeral is then entered by way of set button 38 and stored by store button 40. This procedure is repeated until all of the desired numerals constituting a credit card number, for example, are entered. To erase memory, buttons 38 and 40 are pressed simultaneously. The buttons are preferrably recessed so as to avoid unwanted setting and storing.

Instrument 10 can generate and transmit the telephonic sound tones after "loading" a number by pressing the end of clip 36. Pressing action depresses stylet 42 through hole 44 and into contact with chip contact 45, thereby completing the circuit needed to generate tones. Completed pressing action is shown in FIG. 6B.

Instrument 10 can be equipped either as a pen or a mechanical pencil. In cases where a pen is desired any conventional type ink configurations may be employed. For example, the pen may be arranged as a ball point, roller ball, felt tip, fountain or the like, with accompanying ink containers. It is also possible to use conventional mechanisms to raise and lower the pen dispenser tip. Such mechanisms could include a twistable cap relative to the barrel to drive the pen cartridge downward or where the cap clicks downward to push the pen cartridge as is well known per se. It is also possible to have a solid body wherein the cap 34 and barrel 32 are one piece, with a pen tip cover. The pen can also be constructed of conventional materials such as aluminum, stainless steel, other metals or plastic, for example.

In a pencil configuration, the instrument is equipped with conventional lead dispensing means and can be of the "twist" or "click" type, for example. Construction materials are preferably the same as those for the pen arrangement.

One battery 50 may be employed to power the entire circuit of instrument 10 as shown in FIGS. 5, 6A and 9. As shown in FIG. 9 for example, battery 50 is divided into two batteries A and B, one for providing power to the speaker and one for supplying power to the chip. However, two separate batteries 100 and 106 may be used (see FIG. 6B), whereby battery 100 powers speaker 16' and battery 106 supplies power for chip 46'. In this manner, battery 100 may be changed without "dumping" the stored numbers within the memory-/logic circuit. Batteries 50, 100 and 106 may be of any conventional type.

Chips 46 and 82 may be of any conventional type having memory/logic/output driver capabilities. It is however, possible to employ a chip wherein the desired number or numbers are "burned" in. In such cases the instrument is not to be programmable which eliminates need for set button 38 and store button 40. Various chips having enhanced memory capability can be employed to increase the amount of numbers stored, which is only limited by the adaptability of the switching means employed.

Clip 68 may be employed in alternative manners in order to actuate sound generation. For example, the switch may be constructed such that the clip must be continually depressed until all of the tones for a desired number are transmitted. In another configuration, the clip may be briefly depressed and then released which allows all of the tones for a desired number to be transmitted. Also, depending upon the capabilities of chip 46, pressing the clip once (longer press) can activate transmission of a first desired number such as a telephone number, while two quick presses can activate a second desired number such as a credit card number, or vice versa.

Use of the clip as a switching means provides several advantages. The clip arrangement is highly preferred on most conventional pens and mechanical pencils to prevent loss. Utilization of this "standard" equipment avoids the need for another button or switch. Also, when the clip is in use, such as on a shirt pocket for example, the interpositioning of shirt pocket cloth prevents either sporadic or continual activation of the device which depletes the power supply.

If it is desired to provide instrument 10 with multiple number storing capacity, different switching means is possible. Referring to FIGS. 7 and 9, an alternative sliding switch 74 is fixed to cap 66. Switch 74 in this configuration serves as an "on-off" switch. Selection of the desired number for transmission is preformed by way of rotary ring 78, for example.

Markers 82 are aligned with contacts (not shown) within cap 66 and separately connected to chip 82. Pointer 80 is aligned with a marker 82 corresponding to a contact 94 to connect to speaker 76. When a marker 82 and pointer 80 are aligned by rotating ring 78, the contacts complete a circuit corresponding to a particular number within the memory of chip 82. To generate the tones corresponding to the desired number, switch 74 is slid, thereby completing the overall circuit and generating the tones. By rotating ring 78 and aligning pointer 80 with another marker 82, a new number may be transmitted.

Switch 74 shown in FIG. 9 may be altered to serve a different function. In FIG. 10, switch 74' provides four levels of access to chip 82'. When employed with the rotary markers 82'/pointer 80 configuration, switch 74' allows entry and use of four times as many numbers. However, switch 74' can be chosen to provide any number of access levels to chip 82. In this construction it is preferred to utilize clip 36 (see FIG. 6A) as an "on-off" switch. Also, depending upon the capabilities of chip 82, pressing the clip once (longer press) can activate transmission of a first desired number such as a telephone number, while two quick presses can activate a second desired number such as a credit card number, or vice versa.

Speakers 16 and 78 may be of any conventional type known in the art per se. They may be mounted to instrument 10 in various fashions, such as at the end and surrounded by a grill, flush with the end and covered with a grill, recessed within the cap or housing to enhance sound amplification or the like.

If the user has but a few frequently used phone numbers and/or credit card numbers, a pen or pencil with limited memory can be chosen. If the user has a wider array of desired numbers then a different larger capacity chip may be employed. Thus, the present invention provides convenient, lightweight and reduced size means to transmit a variety of numbers over a telephone. Because the transmitter is contained within a pen or pencil, depending on the desired configuration, the device can be employed for a first task, writing, which the user typically does quite frequently. It can however, serve a second more infrequent task, transmitting. With the ability to write, a typical user, a businessman for example, would tend to remember to carry such a device since he will in all likelihood always carry a pen or pencil. Without the frequent use capability of writing, a user might tend to forget the device. Also, the double function writing and transmitting apparatus eliminates the need for a bulky telephone and credit card number book.

Although this invention has been described in connection with specific forms thereof, it will be appreciated that a wide array of equivalents may be substituted for the specific elements shown and described herein without departing from the spirit and scope of this invention as described in the appended claims.

I claim:

1. A writing instrument capable of producing and transmitting telephonic sound tones comprising:
    (a) elongated housing means having a writing end and a sound transmitting end;
    (b) inscribing means including a writing point carried by said housing at the writing end thereof;
    (c) electronic memory means spaced from said inscribing means and also carried by said housing for storing numbers therein;
    (d) a sound transducer adjacent an end of said housing remote from said inscribing means and connected to said electronic memory means for producing and transmitting sound tones corresponding to said stored numbers;
(e) a battery carried by said housing and connected to supply power to said memory means and said transducer; and
(f) switch means connected to said electronic memory means and to said transducer to actuate transmission of said sound tones.

2. An instrument as defined in claim 1 wherein said elongated housing means comprises:
(a) an upper housing section containing said memory means, said transducer, said battery and said switch means; and
(b) a lower barrel containing said inscribing means.

3. An instrument as defined in claim 2 wherein said upper housing section rotates relative to said lower barrel, which rotation causes said inscribing means to slide longitudinally relative to said lower barrel and into writing or non-writing positions.

4. An instrument as defined in claim 2 wherein said transcribing means is fixed to an end portion of said upper housing section, said upper housing section longitudinally slidable in relation to said lower barrel, whereby sliding movement of said upper housing section causes said inscribing means to longitudinally slide relative to said lower barrel and into writing or non-writing positions.

5. An instrument as defined in claim 1 wherein said housing means comprises:
(a) a barrel containing said memory means, said transducer, said battery and said inscribing means; and
(b) a removable housing cover having said switch means, which cover removably surrounds an upper portion of said lower barrel.

6. An instrument as defined in claim 1 wherein said switch means comprises a pocket clip, said pocket clip having a first end portion fixed to said housing means and a second end portion suspended over a hole in said housing means, whereupon pressure thereon depresses said second end portion through said hole and into contact with said memory means, thereby actuating the production and transmission of said sound tones.

7. An instrument as defined in claim 6 wherein said second end must remain depressed to produce and transmit all tones desired.

8. An instrument as defined in claim 1 wherein said switch means comprises a slidable button, whereby sliding said button actuates production and transmission of said sound tones.

9. An instrument as defined in claim 1 further comprising:
(a) a set button connected to said memory means for entering numbers therein: and
(b) a store button connected to said memory means for storing entered numbers therein.

10. An instrument as defined in claim 1 wherein said inscribing means comprises:
(a) ink;
(b) an ink container; and
(c) ink dispensing means.

11. An instrument as defined in claim 1 wherein said inscribing means comprises:
(a) pencil lead; and
(b) pencil lead dispensing means.

12. An instrument as defined in claim 8 further comprising a rotatable ring mounted on said housing and having a marker to delineate positions relative to said housing, said ring rotating through a multiplicity of points around said housing, each point connecting said memory means and said speaker when said marker and a point are aligned, thereby permitting the production and transmission of different sets of tones by realigning said marker with different points.

13. An instrument as defined in claim 1 wherein said battery comprises:
(a) a first portion connected to supply power to said memory means; and
(b) a second portion connected to supply power to said transducer.

14. An ink pen producing sounds for transmission over telephones comprising:
(a) a generally cylindrically shaped barrel
(b) an ink container positioned within a lower portion of said barrel:
(c) ink dispensing and writing means located in a lower portion of said barrel;
(d) electronic logic means contained within said barrel;
(e) a speaker fixed to said barrel and connected to said logic means;
(f) power supply means connected to said logic means and said speaker; and
(g) switch means connected to actuate production and transmission of telephonic sound tones corresponding to numerical digits through said speaker by way of said logic means.

15. An instrument as defined in claim 6 further comprising a multiple level selector connected to said memory means which accesses varying sets of stored numbers within said memory means.

* * * * *